Dec. 14, 1965  J. R. DAVY ETAL  3,223,829
GLASS SANDWICHES PRIMARILY FOR WINDOWS
OF OPTICAL INSTRUMENTS
Filed Nov. 4, 1960
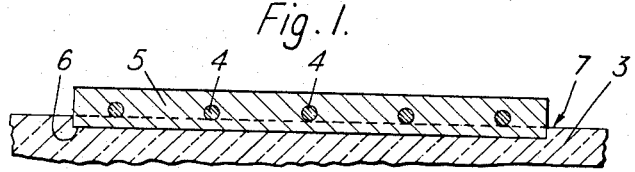
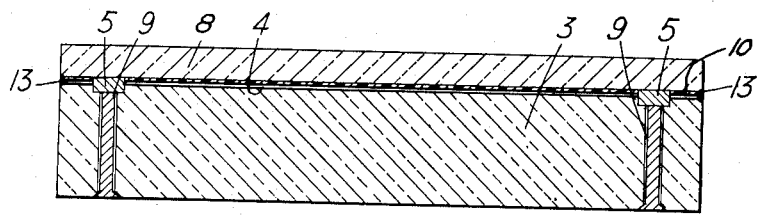
Inventors
JOHN RUPERT DAVY and
ALEXANDER JAMES NAPIER HOPE
By
Mason, Fenwick & Lawrence
Attorneys United States Patent Office 3,223,829
Patented Dec. 14, 1965

3,223,829
GLASS SANDWICHES PRIMARILY FOR WINDOWS OF OPTICAL INSTRUMENTS
John Rupert Davy and Alexander J. N. Hope, both of Anniesland, Glasgow, Scotland
Filed Nov. 4, 1960, Ser. No. 67,435
Claims priority, application Great Britain, Nov. 14, 1959, 38,676/59
5 Claims. (Cl. 219—522)

This invention relates to a glass sandwich primarily but not exclusively for windows for optical instruments involving optical magnification, and of the type in which the sandwich is heated by fine electrically energised elements or wires.

Such glass sandwiches normally comprise glass sheets separated by a transparent cement in which are embedded fine high resistance electrical heating wires, for example the diameter of the wire may be 0.0005 inch or one two-thousandths part of an inch. A glass sandwich of this type is described in our concurrent patent application No. 781,412, filed December 18, 1958, now Patent No. 3,111,570. Such heating wires and their contacts are frequently subjected to the effects of switching on and off the electric heating current, and it is important, especially for example for use in aircraft flying in very low temperature atmospheres, that there should be efficient heating over the whole surface of the sandwich, that is to say there should be no electrical failures, and moreover the sandwich should be able to stand up to the alternate heating and cooling effects for the life of the body in which it is fitted, such as aircraft, or possibly a seagoing craft, or road vehicle.

Hitherto a number of methods have been proposed for leading in the electrical current to the fine resistance wires. For example by pressing the wires between solid metal strips or bus-bars. This involves relatively small areas of contact between the bus-bars and the wires which may, in extreme cases, result in deterioration at such contacts. Another method is to position the wire between two tinned metal strips which are subjected to heat and pressure in order to fuse the union; this may result in poor contact because (a) it is extremely difficult to use high uniform pressures to clamp the strips together without nipping the fine wires, (b) soft solder does not adhere readily to the metal of the resistance wires, (c) the tinned strips do not tin together easily without the use of flux. The flux is undesirable in contact with optical surfaces which cannot later be cleaned because of the fine resistance wires lying across such surfaces.

A further method is to position the fine wires on a lower metal strip and tin over the upper surface of the wires so as to unite them to the lower strip; this too, is difficult without the use of a flux, and may result in high spots where the soft solder has a thickness which results in separation of the glass sheets of the sandwich to an undesirable degree.

According to the invention we provide a glass sandwich primarily for optical instruments involving optical magnification, comprising glass sheets between which are positioned a series of fine electrically conductive elements connected to a bus-bar, in which the bus-bar is formed from a colloidal dispersion of electrically conductive material in which the element ends are embedded, said material after solidification completely surrounding the element ends in situ.

Preferably the colloidal dispersion is a metal dispersion.

An embodiment of the invention will now be described simply by way of example with reference to the accompanying drawings in which:

FIG. 1 is a diagrammatic vertical section through part of a glass sandwich illustrating the method of manufacture, FIG. 2 is a vertical section through the complete glass sandwich, but in a plane at right angles to FIG. 1, and to a reduced scale.

The thicknesses in both figures are shown to a greatly enlarged scale for clearness.

Referring to FIG. 1, the lower glass layer or substrate of the glass sandwich is shown at 3, and the fine electrical resistance wires at 4. These wires may for example be of the order of 0.0005 inch diameter. The bus-bar electrically connecting these element ends is indicated at 5.

A channel 6 is machined, etched or otherwise produced in the surface of the substrate 3. This channel is filled with electrically conducting material which in this example is a colloidal dispersion of silver and an organic binding agent or cement in alcohol known in the trade as "Dag dispersion 962" (Acheson Colloids Limited, Prince Rock, Plymouth), in liquid suspension form. This is baked to remove solvent and the material then solidifies to form a bus-bar of silver and the organic binding agent of cement which is worked flat with the upper surface 7 of substrate 3.

The electric wires 4 are then arranged sinuously over the glass surface, and the element ends lie on the upper surface of the bus-bar material in the channel. The upper part of the bus-bar material is then applied over the top of the element ends, for example by spraying the aforesaid colloidal dispersion through a mask, or lightly brushing same, or by dipping or by any other convenient method. This material unites in situ with the material already in the channel 6 thus forming a bus-bar in which the element ends are embedded in unitary manner.

The depth of the upper coating of bus-bar material may be varied as desired, and in the drawing this is shown of appreciable depth and of rectangular shape when combined with the lower material. We have found, however, that one brush application of the material embeds the resistance wires sufficiently to a depth below the surface of the material not less than the diameter of the wire used, e.g. 0.0005 inch as aforesaid.

We have found that a bus-bar of this nature when united with the resistance wires is capable of carrying a current of 900 amps per square inch in satisfactory manner.

It will be evident that complete contact between the wires and the bus-bar is effected, so that the contact area is large, and the possibilities of deterioration of contact are greatly reduced, while the optical properties of the sandwhich are not adversely affected.

After formation of the bus-bar joint as aforesaid, the upper glass layer 8 of the sandwich is applied and the whole is finally cemented in position, for example as set forth in our aforesaid patent application No. 781,412 utilising a thermo-setting epoxy synthetic resin as the cement between the upper and lower glass layers.

We may utilise a method of thermostatic control of the heating elements by employing the amplified signal from a temperature-sensitive resistance wire to operate the load carrying circuit. The said wire may be in the same plane as the heating elements and parallel to them. Alternatively, the said wire may be in a different plane from the heating elements, electrically insulated from them and disposed otherwise than parallel to the heating elements. Contacts may be made between this temperature-sensitive wire and appropriate terminals by means of colloidal silver or other electrically conductive material as aforesaid.

As shown in FIG. 2 the substrate 3 and the upper glass layer 8 enclose the two bus-bars 5 and the wires 4, the parts being secured together by an epoxy synthetic resin cement 10, the projecting wire ends being cut off and reentrant grooves 13 at the ends filled with cement, and the bus-bars 5 being connected to stud terminals 9 through which the electrical supply is led. The said epoxy synthetic resin cement may be, for example, "Epikote 815" (an epoxide resin based on the condensation product of a polyfunctional halohydrin and a polyhydric phenol with an aliphatic ether diluent, the whole having an epoxide equivalent of 175–210, by Shell Chemicals Ltd.), and a hardener may be added such as K61B (the tri-2-ethyl hexoate of 2,4,6-tris-(dimethylaminomethyl) phenol, by Anchor Chemicals Ltd.).

We claim:

1. A glass sandwich for optical instruments involving optical magnification, comprising a pair of glass sheets disposed in spaced substantially parallel relation to each other, at least one of said sheets being provided with aligned channels on its innermost face, an intervening layer of cement of transparent thermosetting material between said glass sheets, securing the latter together a series of fine electrically conductive elements positioned between said glass sheets in the cement, and bus-bars disposed between said glass sheets and located in said channels and connected to said conductive elements, the bus-bars being formed from a colloidal dispersion of electrically conductive material and an organic binding agent and completely surrounding the element ends in situ.

2. A glass sandwich according to claim 1 in which said colloidal dispersion is of a metal and an organic binding agent.

3. A glass sandwich according to claim 2 in which said colloidal dispersion is of silver and an organic binding agent in alcohol.

4. A glass sandwich for optical instruments involving optical magnification, incorporating heating means for the glass and comprising a pair of spaced substantially parallel glass layers, at least one of said layers being provided with aligned channels on its inner face, an intervening layer of cement of transparent thermo-setting resin between said glass layers, securing the latter together, fine electrical heating wire elements located in the cement between said glass layers, and bus-bars located in said channels and connecting the fine wire ends, said bus-bars being formed of a colloidal dispersion of metal and an organic binding agent and completely surrounding the fine wire ends in situ.

5. A glass sandwich according to claim 4 in which said dispersion is of silver and an organic binding agent in alcohol.

References Cited by the Examiner

UNITED STATES PATENTS

| | | | |
|---|---|---|---|
| 1,916,895 | 7/1933 | Rowe | 219—203 |
| 2,281,843 | 5/1942 | Jira | 29—155.71 |
| 2,440,691 | 5/1948 | Jira | 117—227 |
| 2,470,509 | 5/1949 | Marini | 156—102 |
| 2,526,327 | 10/1950 | Carlson | 219—544 |
| 2,569,773 | 10/1951 | Orr | 219—543 |
| 2,624,823 | 1/1953 | Lytle | 219—543 X |
| 2,640,904 | 6/1953 | Gaiser | 219—472 |
| 2,648,754 | 8/1953 | Lytle | 219—541 |
| 2,710,900 | 6/1955 | Linder | 129—543 |
| 2,761,945 | 9/1956 | Colbert et al. | 219—536 |
| 2,831,792 | 4/1958 | Gaiser | 156—104 |
| 2,864,928 | 12/1958 | Danford | 219—536 |
| 2,960,757 | 11/1960 | Epstein | 29—155.71 |
| 3,029,495 | 4/1962 | Doctor | 29—155.5 |
| 3,042,741 | 7/1962 | Cumpston | 29—155.5 |
| 3,111,570 | 11/1963 | Strang et al. | 88—1 |

FOREIGN PATENTS 106,862   3/1943   Sweden.

RICHARD M. WOOD, *Primary Examiner.*

SAMUEL FEINBERG, *Examiner.*